US012614251B2

(12) United States Patent
Barnett et al.

(10) Patent No.: US 12,614,251 B2
(45) Date of Patent: Apr. 28, 2026

(54) AUTOMATED SATELLITE IMAGERY SPLICING AND CROPPING TOOL WITH METADATA RETENTION

(71) Applicant: Dell Products L.P., Round Rock, TX (US)

(72) Inventors: Alan Barnett, Bandon (IE); Michal Sworzeniowski, Bandon (IE); Matthew Keating, Cork (IE)

(73) Assignee: Dell Products L.P., Round Rock, TX (US)

( * ) Notice: Subject to any disclaimer, the term of this patent is extended or adjusted under 35 U.S.C. 154(b) by 476 days.

(21) Appl. No.: 18/157,995

(22) Filed: Jan. 23, 2023

(65) Prior Publication Data

US 2024/0249385 A1 Jul. 25, 2024

(51) Int. Cl.
| | |
|---|---|
| *G06T 5/00* | (2024.01) |
| *G06F 16/58* | (2019.01) |
| *G06F 16/587* | (2019.01) |
| *G06T 3/40* | (2006.01) |
| *G06T 5/50* | (2006.01) |
| *G06T 7/00* | (2017.01) |

(52) U.S. Cl.
CPC ............... *G06T 5/00* (2013.01); *G06F 16/58* (2019.01); *G06F 16/587* (2019.01); *G06T 3/40* (2013.01); *G06T 5/50* (2013.01); *G06T 7/0002* (2013.01); *G06T 2207/10032* (2013.01); *G06T 2207/30168* (2013.01)

(58) Field of Classification Search
None
See application file for complete search history.

(56) References Cited

U.S. PATENT DOCUMENTS

| | | | | |
|---|---|---|---|---|
| 11,481,904 B1 * | 10/2022 | Holkesvik | ............. | G06T 7/0002 |
| 2011/0064280 A1 * | 3/2011 | Sasakawa | ............. | G06T 3/4038 |
| | | | | 382/113 |
| 2016/0196286 A1 * | 7/2016 | Kim | ......................... | G06T 7/11 |
| | | | | 707/741 |
| 2018/0025649 A1 * | 1/2018 | Contreras | ............. | B64C 39/024 |
| | | | | 701/3 |
| 2023/0092057 A1 * | 3/2023 | Holden | ................... | G06T 11/40 |
| | | | | 345/619 |

OTHER PUBLICATIONS

What is Geofencing?; source: https://www.verizonconnect.com/glossary/what-is-a-geofence/ (Year: 2022).*
What is geofencing? How it works and why it matters for your fleet; source: https://www.geotab.com/blog/what-is-geofencing/ (Year: 2022).*

* cited by examiner

*Primary Examiner* — Chan S Park
*Assistant Examiner* — Promotto Tajrian Islam
(74) *Attorney, Agent, or Firm* — Workman Nydegger

(57) ABSTRACT

Automatic image splicing with metadata retention is disclosed. An image is retrieved from an image repository and checked for missing or invalid pixels. Additional images are retrieved from the image repository based on the missing or invalid pixels. Valid pixels from the additional images are used to replace the missing or invalid pixels in the original image. The resulting spliced image is complete. Metadata from all images represented in the spliced image are included in a metadata lineage associated with the spliced image.

18 Claims, 4 Drawing Sheets

400

Storage Media
408

UI Device
410

Data Storage
412

Memory
402

NVRAM
404

Processor
406

Application(s)
414

AUTOMATED SATELLITE IMAGERY SPLICING AND CROPPING TOOL WITH METADATA RETENTION

FIELD OF THE INVENTION

Embodiments of the present invention generally relate to image processing. More particularly, at least some embodiments of the invention relate to systems, hardware, software, computer-readable media, and methods for generating spliced images with retained image metadata.

BACKGROUND

Satellite images are examples of Earth Observation (EO) data. One problem with EO and satellite image (generally referred to herein satellite images or imagery) retrieval is that, without manual intervention, there is no guarantee that an image file retrieved from an EO data repository is a full image and no guarantee that the image without flaws (e.g., missing pixels, distortions). Flawed images are typically unsuitable for many applications. A satellite image of the earth may be rendered unusable because of cloud cover or for other reasons.

For example, a user may download an image and discover that the image is unusable or unsuitable. The user deletes the image and downloads another image. This process is repeated until a usable image is obtained. If no suitable or usable image is available, the user is required to manually construct an image. This process is very inefficient.

As a result, images retrieved from EO data repositories are typically reviewed manually. This introduces problems from the perspectives of user satisfaction, data lineage, and resource efficiency. For example, manually reviewing a satellite image introduces additional problems because conventional image retrieval tools and cropping tools fail to adequately retain the original image metadata. The metadata lost during these manual processes includes information about the source of the images, the date the image was taken, the processing that was performed on the image, and the like. In effect, there is no guarantee that an image file retrieved from an EO data repository is suitable and the consequence is that manual intervention is required to remedy the issue. To make matters worse, manually correcting these issues often results in the loss of the image metadata.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
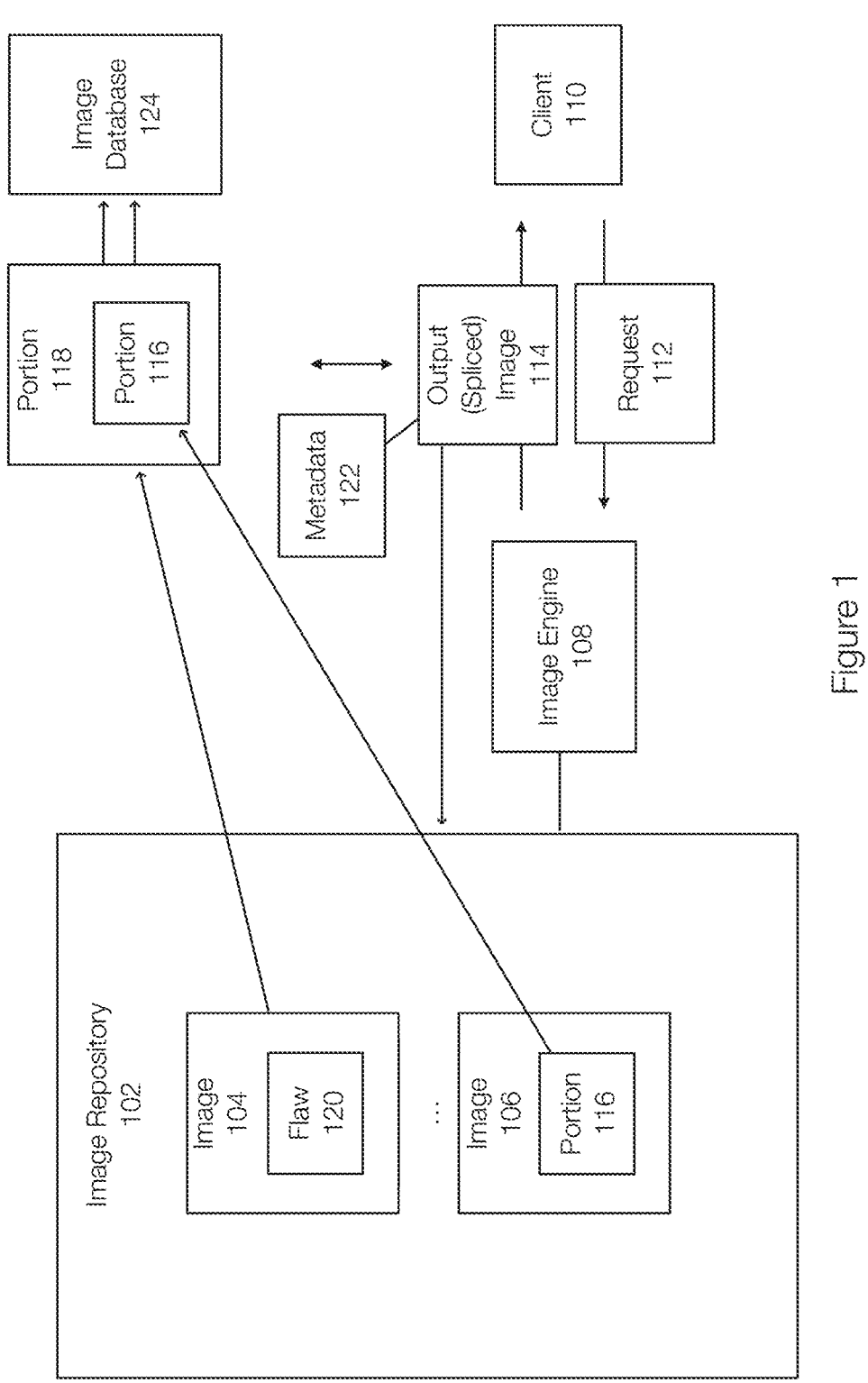
FIG. 1 discloses aspects of generating a spliced image from one or more source images retrieved from an image repository.

Embodiments of the present invention generally relate image processing and in particular to satellite image processing. More particularly, at least some embodiments of the invention relate to systems, hardware, software, computer-readable media, and methods for automatically splicing satellite imagery to generate spliced images while retaining image metadata.

Embodiments of the invention allow a user to access and use altered (e.g., spliced) images with fewer missing pixels (e.g., no missing pixels). The spliced images may be generated automatically in response to a user's request for an image. The images that are spliced together may depend on the content of the user's request.

In one example, a user may request a satellite image from a data repository. The request may serve as the basis for accessing an image repository. In one example, the image repository is searched based on the content of the user's request. An image that is responsive to the request is retrieved and evaluated automatically.

If the image is unsuitable or unusable (e.g., missing pixels, occluded area) additional images are automatically retrieved and a spliced image is automatically generated from the retrieved images. More specifically, the spliced image is generated by identifying the flawed portions of the original image, retrieving other images and then splicing usable sections of these images into the original image to form a coherent image. The spliced image generated in this manner will include up-to-date data to support real-time applications such as monitoring agricultural crop health (i.e., color) in large farms, tracking vessels in a country's fisheries to ensure compliance with relevant regulations, or other application.

Rather than searching for an image that is suitable (and which may be too old), embodiments of the invention splice images together such that the new image (the resulting spliced image) is as up to date as possible based on available images. While portions of the spliced image may have different dates, this is an improvement to simply using older coherent images. In effect, existing images with flaws that make then conventionally unusable can be repurposed and used for various applications.

The splicing operation may be combined with a geodatabase that includes or stores the metadata of the images involved in the splicing operation. This allows the metadata of the original image (or images represented in the new image) to be retained and allows the metadata lineage of the spliced image to be generated and stored. As a result, the new image, which includes portions of other images that have been spliced together, preserves a metadata lineage and may provide a statistical or visual mapping of how the image resulting from the splicing operations was constructed. The original images may also be identified.

Advantageously, an automated and efficient solution for obtaining coherent, usable, and up-to-date, based on available images, EO imagery is disclosed. In addition, embodiments of the invention make images, which were previously unsuitable and/or unusable, to be put to effective use and application.

FIG. 1 discloses aspects of generating a new or coherent image (a spliced image) from satellite imagery. The image repository 102 shown in FIG. 1 may be located in a datacenter and include one or more storage devices on which images are stored. The image repository 102 is an example of EO data storage and handling space.

A client 110 may a computing device with a processor, memory, and other hardware. The client 110, which may be associated with a user and is representative of multiple clients and users, may generate a request 112 for an image 104. The request 112 may, by way of example, identify a geographic area in some manner. The image engine 108 receives the request 112 and access the image 104. In one example, information in the request 112 may allow the image engine 108 to search for or identify images in the image repository 102 that are responsive to the request 112. After finding and retrieving an image 104 (e.g., the most recent response image), the image engine 108 may determine that the image 104 includes a flaw 120 (e.g., missing pixels, an occlusion (e.g., cloud cover)).

In response to discovering a flaw in the image 104, the image engine 108 may generate a new request that seeks for images containing the geographical area corresponding to the flaw in the image 104. In effect, the image engine 108 may seek for similar images. Similar images may include an image of the same geographical area taken at a different time.

In one example, the images 104 and 106 represent a chronological view of a geographic area that were taken by the same or different satellites. The images 104 and 106 may alternatively have in common only a portion of a geographical area but may be responsive to the relevant requests.

More specifically, the image engine 108 may identify the flaw 120 in the image 104 and determine a geofence or perimeter of the flaw 120. The geofence allows the image engine 108 to search for other images in the image repository 102 that may include the area defined by the geofence of the flaw 120. In this example, the image 106 is found and an evaluation of the image 106 may determine that the portion 116, which corresponds to the flaw 120, is suitable. This allows the image engine 108 to stitch the portion 116 of the image 106 with the portion 118 of the image 104 to generate an output or spliced image 114. The image engine 108 may return the output image 114 to the client 110. In one example, the output image 114 is up to date in the sense that the contents of the output image 114 may correspond to the most recently available portions of the geographical area represented or included in the output image 114. More specifically, the portion 118 may be the most recent usable image of geographical area represented by the image 104 and the portion 116 may be the most recent usable image of the geographical area represented by the portion 116. Together, the portions 116 and 118 are an up-to-date output image 114. In one example, the output image 114 may be stored in the image repository 102 after being generated. The output image 114 may alternatively or additionally be stored in an image database 124. The image database 124 may store spliced images.

The output image 114 is also associated with metadata 122. The metadata 122 may be a metadata lineage that includes the metadata of images used in generating the output image 114. Thus, the metadata 122 may include or link to metadata of the image 104 and to metadata of the image 106. Further, once the flaw 120 is effectively removed from the output image 114, the output image 114 may also include new metadata that is based on the output image 114. The new metadata may be generated.

In one example, a user may provide or select a path to or generate a geojson (open data standard for geographical representation) file containing coordinates of a geographical area of interest. The file may also include additional information or metadata such as, by way of example, satellite type and image capture date. The user may also specify which image bands are desired, dates, date ranges, or the like or combination thereof. For satellite images, a band may refer to a layer of an image that may correspond to a particular wavelength or channel. Example bands include green band, red band, near infrared band, and the like. Bands are images captured by satellites using their instruments at specific wavelengths, resolutions, and bandwidths. Default parameters may be set if the user does not specify certain parameters.

In one example, the request 112 is a geojson file and the coordinates or area to be retrieved are identified in the request 112 by a geofence in accordance with geojson specifications. The geofence may be defined by points, line strings, polygons, or combinations thereof. The request 112 may also identify specific certain image bands.

Once the user request 112 is received, the image engine 108 may retrieve all satellite imagery bands specified in the requests 112 by the client 110 (or the user of the client 110) from the data or image repository 102, such as Copernicus Open Access Hub. The image engine 108 may be able to access different image repositories using, for example, appropriate application programming interfaces (APIs). The image engine 108 may also modify the request 112 based on requirements or metadata of the data repository being accessed.

In one example, image searches in the image repository 102 are performed using geojson files. If the image repository 102 only allows coordinates, the image engine 108 may be required to extract the coordinates from the geojson file using an appropriate module or component.

When a user specifies specific bands, in one embodiment, only data corresponding to the identified bands are retrieved from the image repository 102. The band images are then cropped at a geofenced area specified by the user in the geojson file. Thus, the original file retrieved in response to the initial user request may be cropped based on the geojson file.

In the scenario where the user specifies certain bands for download—only that data would be downloaded from the image repository 102. These band images would then be cropped at the geofenced area specified by the user in the requests 112 or in the geojson file.

Once the cropped image is generated, the cropped image is checked for flaws, such as missing bits or missing pixels. An image retrieved from the image repository 102 may be missing bits for various reasons. For example, the flight path of a satellite that captured the image by vary from one orbit to the next orbit. As a result, some of the images may be missing sections. Another cause of flaws in an image relate to calculation errors during processing by the satellite. Examples causes of flaws also include poor lighting and cloud cover.

When the cropped image is checked or evaluated for missing bits, the missing or flawed bits are noted uniquely from the other bits. They may be noted as null bits for example. The bits of the image may be represented as an array and the missing bits are identified as null bits in the array. A missing bit check is performed by accessing the array of bits and screening for bits that resemble anomalies. Missing data bits, for example, may show up as white pixels that can be quickly distinguished from genuine image bits during image analysis.

After the missing bits check is complete, a subsequent procedure may be performed to check if the number of missing bits is outside of a given threshold (e.g., set by the user). For example, an image where ninety percent of the pixels are missing may not be useful and may be discarded as a candidate of an original image.

The image engine 108 may retrieve coherent image sections from other images of the same band type and closest date (e.g., within a specified date range) to the original cropped image. These image sections may be used to fill-in the missing pixels in the original cropped image. The missing pixels are then filled in from the additional images.

In one example, the output or splices images may be stored in an image database 124. Thus, the image database 124 may contain spliced images and their metadata and may also include the various portions (e.g., the portions 118 and 116) and their metadata.

The process of splicing images, such as the portion 118 and the portion 116, together is performed, in one example, by creating an image bitmask of the missing image area. This bitmask is converted into a geojson file by assigning coordinates to pixels on the border of the missing area and including this information to the geojson file. This geojson file is used to retrieve an image from the image repository 102. The geofenced area corresponding to the missing pixels in the original image is then be applied to the retrieved image and the data within this area is cut and pasted onto the missing parts of the original image.

Thus, the portion 118 is generated by processing the image 104 to identify the missing bits and a geofence. The geofence becomes, in effect, another request used to search the image repository 102. This allows the portion 116 to be identified and spliced together with the portion 118 to generate the output image 114.

The process of merging or splicing the relevant portion of a newly retrieved image into the original image may include cycling through the original image's array and replacing the null bits with bits from the array of the newly retrieved image. This process would be repeated for every image in a user specified set. In other words, the process of generating a spliced image may require multiple images. For example, the second image may also have a flaw that coincides with the flaw of the original image and may remedy only a portion of the original flaw. As a result, another request is generated and another image is retrieved. This process may be performed recursively until the spliced image is complete with no flaws or missing pixels.

Figure 2:
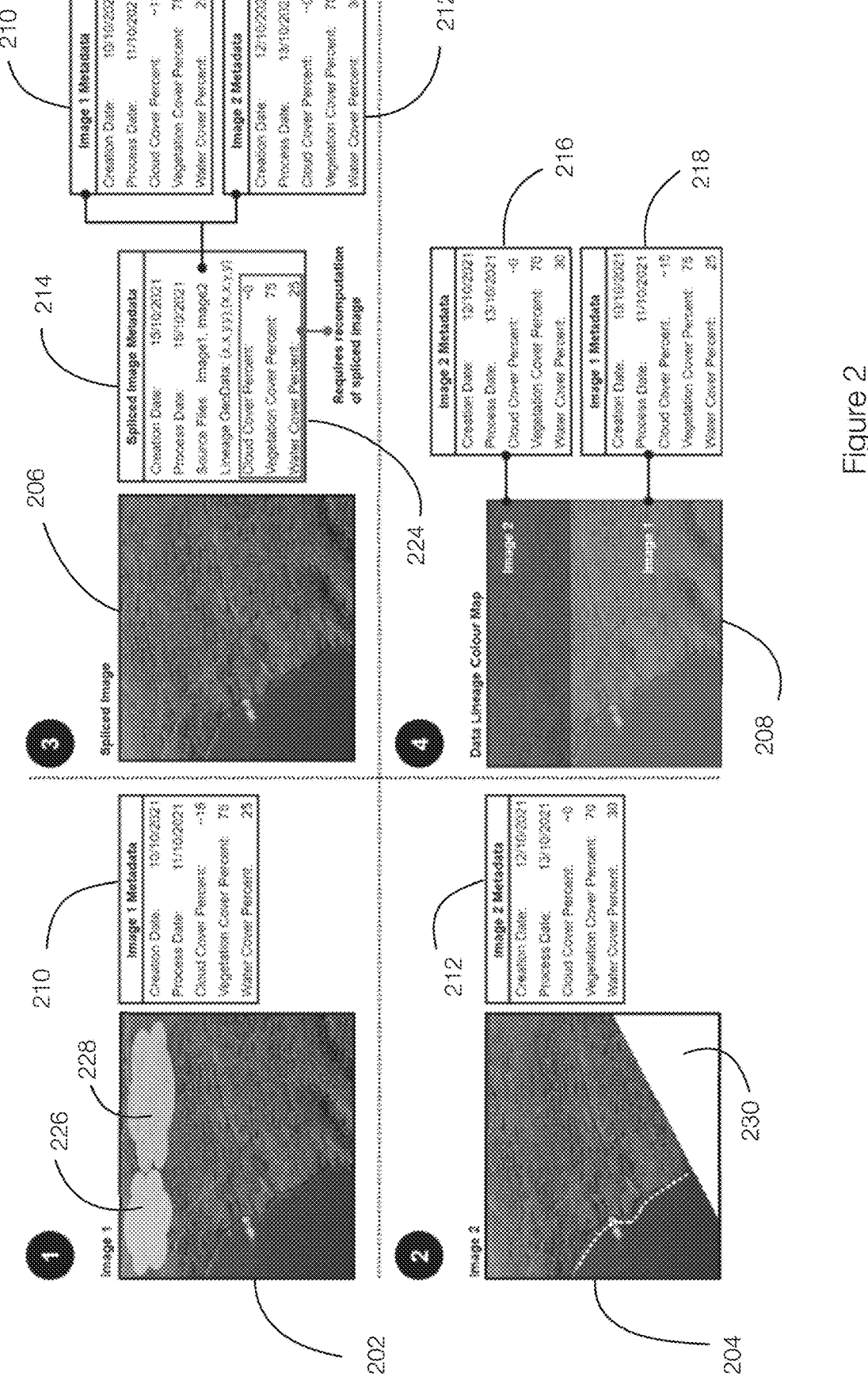
FIG. 2 discloses aspects of generating a spliced image and aspects of a metadata lineage for the spliced image.

FIG. 2 discloses aspects of splicing images. FIG. 2 illustrates an image 202 that was retrieved from an image repository, such as the repository 102, based on a request that may have been submitted as a geojson file. The image 202 is associated with metadata 210, which identifies, by way of example, a creation date, a process date, a cloud cover percent, a vegetation cover percent, and a water cover percent. The specific metadata may depend on the image and the manner in which the image was created.

As illustrated, the image 202 includes flaws 226 and 228 that are identified, in one example, by the image engine 108. The flaws 226 and 228, in this example, are caused by cloud cover. Thus, the image 202 includes missing pixels associated with the flaws 226 and 228. The flaws 226 and 228 may be identified when the image 202 is retrieved from the image repository and evaluated. Each missing bit in the image 202 (or in the flaws 226 and 228) may be identified. Further, a geofence that defines the areas of the flaws may be generated and represented in a subsequent geojson file.

The geojson file generated from the flaws of the image 202 may serve as the basis for another search of the image repository. A search of the image repository, using the geojson file corresponding to the flaws 226 and 228, may result in the image 204. The image 204 is associated with metadata 212, which is different from the metadata 210. The image 204 also includes a flaw 230. The flaw 230 is caused by a flight path of the satellite in this example. However, the flaw 230 has no impact on the process at least because the geographic area of interest with respect to the image 204 is the area corresponding to the flaws 226 and 228.

Using the image 204 (or the portion corresponding to the geofence in the geojson file), the image 206 is generated by stitching the relevant portions of the image 202 and the image 204 together. In one example, the null bits of the image 202 (after processing) is replaced with the valid bits from the image 204. Thus, the relevant portions of the image 204 are spliced into the image 202 to generate the image 206.

The image 206, which is a generated or spliced image, is associated with metadata 214. The metadata 214 may differ from the metadata 210 and 212. In this example, the metadata 214 may include a creation date and a process date that reflect the date that the spliced image 206 was generated. The metadata 214 also includes lineage data, which links to the images 202 and 204 or more specifically to the metadata 210 and 212. Other metadata 224 may be regenerated. The metadata 224 is generated from the spliced image 206 in one example. Thus, the cloud cover percent is 0 percent in the spliced image 206 as the flaw caused by cloud cover has been effectively removed. In this example, the metadata 214 along with the lineage metadata 210 and 212 allows a user to understand that different portions of the image 206 may have different characteristics, such as date taken.

In example embodiments, the geofence can be specified in different manners. For example, rather than specify a geofence that corresponds specifically to the flaws 226 and 228, a geofence that is rectangular in shape may be specified. However, this may result in the replacement of valid data in the original image 202 with data that may be older or less valid.

The image 208 illustrates a data lineage color map and the associated metadata 216 and 218.

Figure 3:
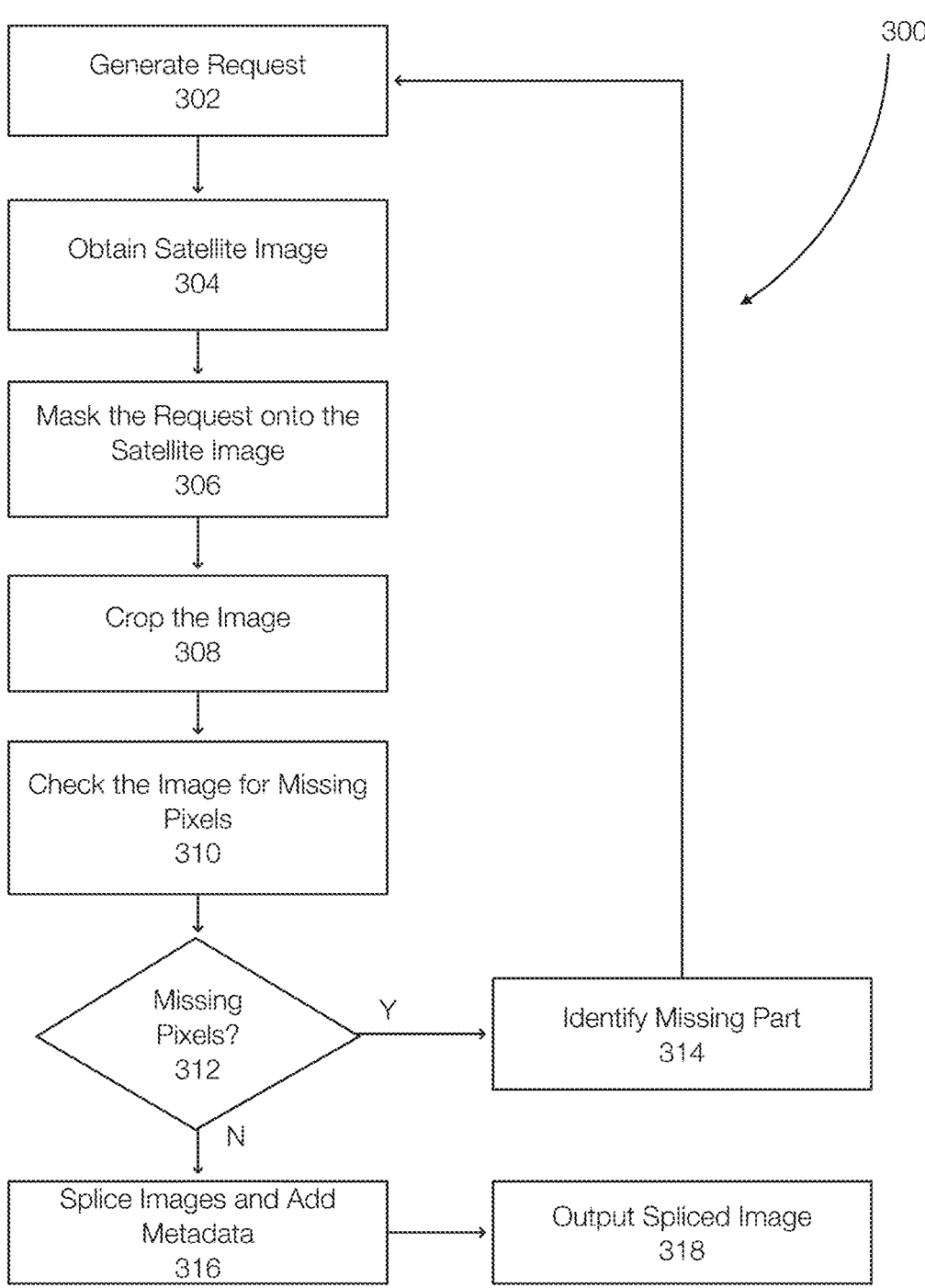
FIG. 3 discloses aspects of generating a spliced image.

FIG. 3 discloses aspects of generating a spliced image. The method 300 includes generating 302 a request. Generating 302 a request may include identifying or generating an input file such as a geojson file. The request thus specifies or defines a geographic area of interest. The request may also identify other information such as satellite type, image capture date (or date range), image bands, or the like.

Using the geojson file or the information in the request, a satellite image is obtained 304 from an image repository. The request is then masked 306 onto the satellite image. More specifically, the image is effectively cropped 308 such that the cropped image includes image data for the geographical area of interest defined by the initial request.

The initial cropped image is the base or original image retrieved by the image engine. After the cropped image is generated, the cropped image is checked 310 for missing pixels.

If pixels are missing from the original image (Y at 312), the missing pixels or portions are identified and the method returns to generating 302 a new request (e.g., a new geojson file). The new request identifies or defines the geographical area corresponding to the missing pixels in the original cropped image. In this example, the next request thus relates to finding a satellite image that includes the portion or image data missing from the original cropped image.

This process may repeat recursively. In one example, the method 300 may identify multiple images that will be spliced together. Once the method 300 determines that the most recent image is not missing any pixels (N at 312) for the relevant geofence in the most recent request, the images are spliced together and metadata is added 316. Splicing the images may include replacing the missing pixels in the various images with pixels from the images that have valid pixels. The spliced image is then output 318. The spliced image may include contributions from multiple images. In one example, the spliced image is up to date in the sense that flaws in the original image have been replaced with the best available pixels (e.g., most recent in terms of date). The spliced image, along with other spliced images generated in this manner, may be stored in a database and can be retrieved and used in various applications.

When adding 316 metadata to the spliced image being generated from multiple images, the metadata from the original images retrieved from the image repository are linked to the spliced image being generated and subsequently output 318. Further, additional or new metadata may be added to or associated with the spliced image. This allows the lineage of the spliced image to be determined and allows all contributors to be acknowledged.

Embodiments of the invention automatically generate spliced images that are responsive to the needs and applications of users. Embodiments of the invention allow images with issues that make them unusable or unsuitable to be used in responding to user requests. Further, the spliced images are generated automatically without input from the user in some embodiments. Once a user provides an initial input, such as a geojson file, a spliced image, if necessary, can be automatically generated to satisfy the user's request.

Embodiments of the invention also reduce time requirements. For example, users can avoid the process of downloading an image only to find that the image is unusable. Embodiments of the invention also ensure that the spliced image has the metadata about the original images used to generate the spliced image. This avoids the need to pull the metadata by accessing the original images. The metadata can be presented at least in a visual and/or readable form.

Embodiments of the invention further give purpose to images and data that would otherwise be unsuitable or unusable. Unsuitable images can consume storage space, consume bandwidth, processing power, user time, and the like. Images that have flaws or other issues are conventionally a waste of resources. Embodiments of the invention enable these types of images to be a valuable resource. In some examples, it is possible that the most up-to-date image of an area will be this a spliced image. In this case, the output image not only repurposes previously unusable or unsuitable data, but also allows a most recent image of a given area to be generated.

Applications that may benefit from spliced imagery include surveys in semi-real time performed by geological companies, the agricultural industry, marine industry, and conservation companies. Embodiments of the invention generate spliced images in an automated fashion with a metadata lineage. Embodiments of the invention enable spliced images to be generated that can satisfy various requirements such as are restrictions, time frame restrictions, and the like.

Embodiments of the invention may also benefit machine learning algorithms. Bad input (e.g., images with missing pixels) to the machine learning algorithms, can be avoided.

Consider, for example, two DIAS (digital information archiving system) platforms competing in the earth observation data space. The first DIAS company uses a storage infrastructure that includes an image engine configured to generate spliced images. The second storage uses a storage infrastructure without any earth observation specific peripherals. The first DIAS platform will have a larger library of earth observation images due to the spliced image output. The first DIAS platform will also be able to produce more up-to-date content via the splicing, and in some cases may have the most up-to-date images of a given geographical location due to this procedure being able to capture usable sections of different image and splice them. The first DIAS platform will also provide the spliced images with metadata, linked metadata and data lineage, as well as the option for an included data lineage map with the output.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, image processing operations, image splicing operations, image search operations, geographical image search operations, metadata operations, metadata lineage operations, or the like or combination thereof. More generally, the scope of the invention embraces any operating environment in which the disclosed concepts may be useful.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data storage functionality and/or processing functionality, including image processing, for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data system components such as databases, storage servers, storage volumes (LUNs), storage disks, services and servers, for example, may likewise take the form of software, physical machines, containers, or virtual machines (VMs), though no particular component implementation is required for any embodiment.

It is noted with respect to the disclosed methods, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1

A method comprising: retrieving a first image from an image repository that is responsive to a request that identifies a geographical area, checking the first image for flaws, wherein the flaws correspond to missing pixels in the first image, generating a second request for a second image that is responsive to the second request, wherein the second request identifies a second geographical area corresponding to the flaws in the image, splicing pixels in the second image corresponding to the second geographical area into the first image to generate a spliced image, generating a metadata lineage for the spliced image, and outputting the spliced image.

Embodiment 2

The method of embodiment 1, further comprising generating the request, wherein the request defines a first geographical area.

Embodiment 3

The method of embodiment 1 and/or 2, wherein the request comprises a geojson file and wherein the request is used to search the image repository and wherein the first image comprises a satellite image.

Embodiment 4

The method of embodiment 1, 2, and/or 3, wherein the request specifies one of a date range and one or more bands.

Embodiment 5

The method of embodiment 1, 2, 3, and/or 4, further comprising cropping the first image to generate a cropped image corresponding to the first geographical area.

Embodiment 6

The method of embodiment 1, 2, 3, 4, and/or 5, further comprising masking the request onto the first image prior to cropping the first image.

Embodiment 7

The method of embodiment 1, 2, 3, 4, 5, and/or 6, wherein the missing pixels are associated with an occlusion or a flight path of a satellite.

Embodiment 8

The method of embodiment 1, 2, 3, 4, 5, 6, and/or 7, further comprising recursively generating requests and retrieving additional images until no pixels are missing.

Embodiment 9

The method of embodiment 1, 2, 3, 4, 5, 6, 7, and/or 8, wherein the metadata lineage includes or links to metadata of the first image and metadata of the second image.

Embodiment 10

The method of embodiment 1, 2, 3, 4, 5, 6, 7, 8, and/or 9, further comprising generating new metadata from the spliced image, further comprising including the new metadata in the metadata lineage.

Embodiment 11

A system, comprising hardware and/or software, operable to perform any of the operations, methods, or processes, or any portion of any of these, or any combination thereof disclosed herein.

Embodiment 12

A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, or client may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor or similar hardware is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
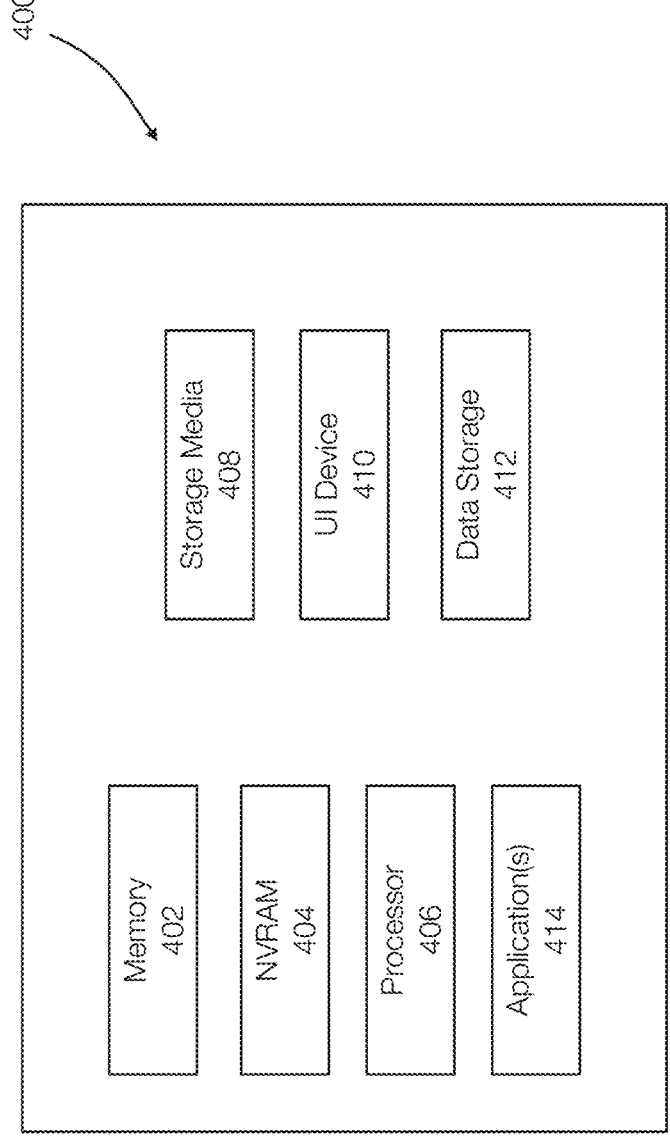
FIG. 4 discloses aspects of a computing device, system, or entity.

With reference briefly now to FIG. 4, any one or more of the entities disclosed, or implied, the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid-state device (SSD) storage. As well, one or more applications 414 may be provided that comprise instructions executable by one or more hardware processors 406 to perform any of the operations, or portions thereof, disclosed herein. The device 400 may also be representative of a computing environment such as an edge system or a datacenter where the computing environment may include multiple processors and other hardware.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
retrieving a first image from an image repository that is responsive to a request that identifies a geographical area;
cropping the first image using a first geofence defined in the request to generate a cropped image corresponding to the geographical area;
evaluating an array of pixels in the cropped image to identify missing pixels based on pixel values that correspond to null bits or anomalous values;
determining a flaw region comprising missing pixels and generating a second geofence that defines a boundary around the flaw region;
generating a second request for a second image that is responsive to the second request, wherein the second request identifies a second geographical area corresponding to the second geofence;
retrieving the second image from the image repository;
extracting pixels from the second image within the second geofence and inserting the extracted pixels into the cropped image in place of the missing pixels to generate a spliced image, wherein the second image is cropped to extract a portion corresponding to the second geofence prior to inserting the extracted pixels into the cropped image;
generating a metadata lineage for the spliced image, wherein the metadata lineage includes metadata of the first image and metadata of the second image and further includes newly generated metadata associated with the spliced image; and
outputting the spliced image.

2. The method of claim 1, further comprising generating the request, wherein the request defines a first geographical area.

3. The method of claim 2, wherein the request comprises a geojson file and wherein the request is used to search the image repository and wherein the first image comprises a satellite image.

4. The method of claim 2, wherein the request specifies one of a date range and one or more bands.

5. The method of claim 1, further comprising masking the second geofence onto the second image prior to extracting the portion corresponding to the second geofence.

6. The method of claim 1, wherein the missing pixels in the cropped image are associated with an occlusion or a flight path of a satellite.

7. The method of claim 1, further comprising recursively generating requests and retrieving additional images until no pixels are missing.

8. The method of claim 1, wherein the metadata lineage includes or links to metadata of the first image and metadata of the second image.

9. The method of claim 8, further comprising generating new metadata from the spliced image, further comprising including the new metadata in the metadata lineage.

10. A non-transitory storage medium having stored therein instructions that are executable by one or more hardware processors to perform operations comprising:

retrieving a first image from an image repository that is responsive to a request that identifies a geographical area;

cropping the first image using a first geofence defined in the request to generate a cropped image corresponding to the geographical area;

evaluating an array of pixels in the cropped image to identify missing pixels based on pixel values that correspond to null bits or anomalous values;

determining a flaw region comprising missing pixels and generating a second geofence that defines a boundary around the flaw region;

generating a second request for a second image that is responsive to the second request, wherein the second request identifies a second geographical area corresponding to the second geofence;

retrieving the second image from the image repository;

extracting pixels from the second image within the second geofence and inserting the extracted pixels into the cropped image in place of the missing pixels to generate a spliced image, wherein the second image is cropped to extract a portion corresponding to the second geofence prior to inserting the extracted pixels into the cropped image;

generating a metadata lineage for the spliced image, wherein the metadata lineage includes metadata of the first image and metadata of the second image and further includes newly generated metadata associated with the spliced image; and outputting the spliced image.

11. The non-transitory storage medium of claim 10, further comprising generating the request, wherein the request defines a first geographical area.

12. The non-transitory storage medium of claim 11, wherein the request comprises a geojson file and wherein the request is used to search the image repository and wherein the first image comprises a satellite image.

13. The non-transitory storage medium of claim 11, wherein the request specifies one of a date range and one or more bands.

14. The non-transitory storage medium of claim 10, further comprising masking the geofence onto the second image prior to extracting the portion corresponding to the geofence.

15. The non-transitory storage medium of claim 10, wherein the missing pixels in the cropped image are associated with an occlusion or a flight path of a satellite.

16. The non-transitory storage medium of claim 10, further comprising recursively generating requests and retrieving additional images until no pixels are missing.

17. The non-transitory storage medium of claim 10, wherein the metadata lineage includes or links to metadata of the first image and metadata of the second image.

18. The non-transitory storage medium of claim 17, further comprising generating new metadata from the spliced image, further comprising including the new metadata in the metadata lineage.

\* \* \* \* \*